United States Patent [19]
Simpson et al.

[11] Patent Number: 5,648,636
[45] Date of Patent: *Jul. 15, 1997

[54] NON-DETONABLE AND NON-EXPLOSIVE EXPLOSIVE SIMULATORS

[75] Inventors: Randall L. Simpson; César O. Pruneda, both of Livermore, Calif.

[73] Assignee: Regents of the University of California, Oakland, Calif.

[*] Notice: The term of this patent shall not extend beyond the expiration date of Pat. No. 5,359,936.

[21] Appl. No.: 438,003

[22] Filed: May 9, 1995

Related U.S. Application Data

[60] Continuation-in-part of Ser. No. 221,568, Apr. 1, 1994, Pat. No. 5,413,812, which is a division of Ser. No. 27,366, Mar. 8, 1993, Pat. No. 5,359,936.

[51] Int. Cl.$^6$ .................................................. F42B 4/18
[52] U.S. Cl. .................................... 102/355; 102/527
[58] Field of Search ..................................... 102/355, 527

[56] References Cited

U.S. PATENT DOCUMENTS 5,359,936  11/1994  Simpson et al. .................... 102/355
5,413,812   5/1995  Simpson et al. .................... 427/212

*Primary Examiner*—Peter A. Nelson
*Attorney, Agent, or Firm*—L. E. Carnahan; Henry P. Sartorio

[57] ABSTRACT

A simulator which is chemically equivalent to an explosive, but is not detonable or explodable. The simulator is a combination of an explosive material with an inert material, either in a matrix or as a coating, where the explosive has a high surface ratio but small volume ratio. The simulator has particular use in the training of explosives detecting dogs, calibrating analytical instruments which are sensitive to either vapor or elemental composition, or other applications where the hazards associated with explosives is undesirable but where chemical and/or elemental equivalence is required. The explosive simulants may be fabricated by different techniques. A first method involves the use of standard slurry coatings to produce a material with a very high binder to explosive ratio without masking the explosive vapor, and a second method involves coating inert substrates with thin layers of explosive.

10 Claims, 4 Drawing Sheets

NON-DETONABLE AND NON-EXPLOSIVE EXPLOSIVE SIMULATORS

The United States Government has rights in this invention pursuant to Contract No. W-7405-ENG-48 between the United States Department of Energy and the University of California for the operation of Lawrence Livermore National Laboratory.

RELATED APPLICATIONS

This application is a continuation in part (CIP) of Ser. No. 08/221,568 filed Apr. 1, 1994 and now U.S. Pat. No. 5,413,812 which is a division of Serial No. 08/027,366 filed Mar. 8, 1993, now U.S. Pat. No. 5,359,936 issued Nov. 1, 1994.

BACKGROUND OF THE INVENTION

The present invention relates to the detection of explosives, particularly by instruments or dogs, and more particularly to explosive simulants which are chemically equivalent but not detonable or explodable for use in training dogs, calibrating instruments, and other applications where a non-explosive simulant of an explosive is needed, and to methods for making the simulants. These materials are referred to as Non-hazardous Explosives for Security, Training and Testing (NESTT).

Various methods and apparatus have been developed for detecting explosives. As the concern of terrorist actions increases, the need to develop effective explosive detection increases. Most recently explosives detecting dogs and sensitive analytical technologies have been utilized. To enable the training of such dogs and/or the calibrating of sensitive instruments, it has been necessary to use large quantities of explosives which pose a hazard as well as preventing dog training or instrument utilization is some critical or restricted areas. For example, during the training and utilization of the dogs, quantities of explosives are carried in vehicles and placed in buildings which resulted in the possibility of explosive detonation. Whenever dogs are used to detect for illicit explosives, real explosives are in close proximity to verify that the dog is working and to reward the animal. The need for explosives thus restricts detection in populated areas such as airports. Where explosives were banned due to the location or equipment within an area, training could not be undertaken. Similarly, calibrating of sensitive analytical instruments used for the detection of explosives could only be accomplished by the presence of similar explosives, though in small quantities, but creating a hazard in and of themselves. There are many other applications that require chemical equivalence to explosives without the explosive hazard such as research and development activities in explosive destruction and processing technologies.

Thus, there has been a need to develop safe methods of training explosives detecting dogs and/or calibrating sensitive analytical instruments, and other applications, without the use of actual explosives. The present invention satisfies that need by providing explosive simulants which are chemically equivalent to explosives in nearly all respects, but cannot chemically react violently (no detonation or explosion). In addition to the chemical equivalence, the chemical elemental composition can also be simulated for detection by instruments that do not rely on odors. Thus, the use of actual explosives for training and/or instrument calibration, or other applications, could be eliminated, thereby eliminating the hazards associated with the use of explosives, which is defined herein to mean high explosives as well as gun and rocket propellants.

An explosion is defined as a rapid energy release while detonation is energy release at supersonic velocities. Thus a non-detonable material may still be explodable. Therefore, for safe use NESTT materials are desired which are non-detonable and also non-explodable.

SUMMARY OF THE INVENTION

It is an object of the present invention to provide non-detonable and non-explodable explosive simulants.

A further object of the invention is to provide a simulator which is chemically equivalent to an explosive, but is not detonable or explodable.

A further object of the invention is to provide a simulator that has at least one of scent, chemical element, chemical bonding pattern, x-ray absorption, and isotope ratio equivalence to an explosive, but is non-detonable and non-explodable.

A further object of the invention is to provide a method for fabricating non-detonable and non-explodable explosive simulants.

Another object of the invention is to provide methods for producing explosive simulators which involve formulating materials with large surface areas of explosives, but with volume too small to sustain detonation or explosion.

Another object of the invention is to provide a method for producing chemically equivalent explosive simulants using slurry coating techniques.

Another object of the invention is to provide a method for fabricating chemically equivalent explosive simulants by coating inert beads, fibers, foams, or similar materials, with thin layers of explosive molecules to produce a material with a high surface-to-volume ratio of reactive-to-inert materials.

Another object of the invention is to provide a method for fabricating explosives simulants by distributing explosive molecules in an inert matrix that results in a non-detonable and non-explosive material.

Other objects and advantages will become apparent from the following description and accompanying drawing, which basically provides explosive simulants for safe methods of training explosive detecting dogs, calibration of sensitive analytical instruments for explosive detection, or other applications, without the use of the actual explosives, thereby eliminating hazards associated therewith. The invention is basically a material which contains small amounts of the actual energetic material to be simulated, but only as a minor component overall in a non-reactive matrix or on a non-reactive substrate. The invention includes the fabrication of explosive simulants which are chemically equivalent to explosives, but cannot chemically react violently (not detonable as well as being non-explosive). The methods for fabricating the explosive simulants involve formulating materials with large surface areas of explosives, but with volumes too small to sustain detonation. These fabrication methods are carried out by either standard slurry coating techniques to produce a material with a very high binder to explosive ratio, and by coating of inert beads with thin layers of explosive molecules.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1A:
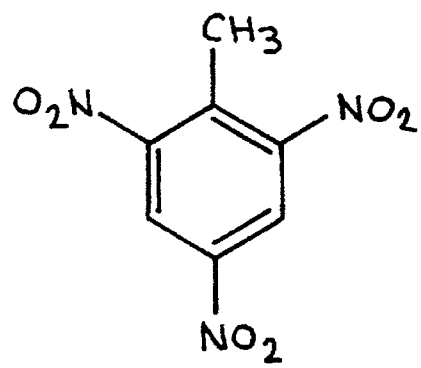
FIGS. 1A and 1B illustrate the chemical formulas of the components TNT and cyanuric acid, used in explosive simulants fabricated in accordance with the present invention.

The present invention is directed to a means for training dogs to detect (sniff) explosives (including gun and rocket propellants), calibrating explosive sensitive analytical instruments, or other applications. As the potential for terrorist actions involving use of explosives increases, the need to develop safe methods of detection has become more apparent. Currently the use of dogs to detect explosives has greatly increased. To enable these dogs to become proficient, training in various locations and under various conditions becomes essential. In the past, this dog training has been carried out utilizing substantial quantifies of explosives which are selectively located in various buildings, areas, etc., and transported by vehicles between training locations. Naturally, training exercises using explosives pose a hazard both to the trainer, the dog, the building or location, and the transport vehicle. Also, in some cases, restrictions on the presence of explosives in a particular building or area may prevent training in some critical areas. Explosives are also present when dogs are actively working to verify that they are detecting explosives and as a reward.

By use of the present invention in the training of explosive detecting dogs, for example, the training can be carried out safely without the hazards of explosive use, and can be carried out in those areas restricted from the presence of explosives. This is accomplished by the use of simulators which are chemically equivalent to explosives, but are not detonable or explodable. The simulators would produce the same smell or scent as the actual explosive and thus enable the dog to learn to sniff-out certain explosives.

Materials which dogs can be trained to sniff-out or detect, and which therefore can be used to form the simulants of the present invention include but are not limited to the following types and classes of explosives: 1. Nitro Compounds: A. aliphatic nitro compounds: nitromethane; 5-nitro triazol-3-one (NTO); B. aromatic nitro compounds: nitrobenzene; trinitrotoluene (TNT); dinitrotoluene (DNT); mononitrotoluene (MNT); picric acid; trinitro triamino benzene (TATB); 3,5-dinitro-2,6-bis-picrylamino pyridine (PYX); 2. Nitrate Esters: methyl nitrate; nitroglycerine (NG); ethylene glycol dinitrate (EGDN); diethylene glycol dinitrate (DEGDN); MTN; 2,2-bis[(nitroxy)methyl]-1,3-propanediol dinitrate (or pentaeritol tetranitrate) (PETN); nitrocellulose; trimethylol ethyl trinitrate (TMETN); 3. Nitramines: tetryl; hexahydro-1,3,5-trinitro-1,3,5-triazine (RDX); methylamine nitrate; octahydro-1,3,5,7-tetranitro-1,3,5,7-tetrazocine (HMX); nitroguanidine; 4. Acid Salts ammonium nitrate; ammonium perchlorate; urea nitrate; ammonium picrate; lead azide; lead styphnate; mercury fulminate and other fulminates. Other salts including sodium nitrate, potassium nitrate, potassium perchlorate, ammonium chlorate, sodium chlorate and potassium chlorate which are not explosives by themselves but are explosives in combination with other compounds can be used. Other materials include primary explosives which are most commonly used as initiating compounds but not usually alone; of these, organic peroxides, e.g. hexamethylene triperoxide diamine (HMTD) and triacetone triperoxide (TATP), could be used in a simulant. With these materials, common dynamites, and formulated explosives (Comp. C-4 and Comp. B), can be simulated.

The following commercially available explosives can be used: IMR 4895 Smokeless Powder (single base); Goex Black Powder; Hercules Red Dot Smokelesss Powder (double base); ICI Nitropel (pelleted TNT); Dupont Detaprime Boosters (plasticized PETN); C-4 (U.S. Military); Detasheet (plasticized PETN); Composition C (plasticized RDX); NAX Demex 100 (plasticized RDX); Semtex (plasticized PETN & RDX); Dupont Tovex Trenchrite (methylamine & ammonium nitrate water gel); Atlas 7D (sensitized ammonium nitrate/fuel oil emulsion); Atlas Powermax 440 (ammonium nitrate/fuel oil emulsion); SEC Detagel (hexamine & ammonium nitrate water gel); SEC T-100 Binary (solid componenet; ammonium & sodium nitrate); Composition B (TNT & RDX); PETN (waxed & graphited); PYX; RDX (waxed and graphired); Nitromethane (liquid).

For detection techniques which rely on vapor signatures, such as the olfactory sense of dogs or chemical mass spectral techniques, adequate gas concentrations can be met by maintaining a very large surface area of the energetic material, but a small mass and volume fraction relative to the inert component. Explosiveness, burn rate, and ignition properties can be minimized by using small quantities of the energetic component and selecting the major component so that it is very non-reactive, has a high heat capacity and density, low thermal conductivity, and has a low modulus to reduce the localized deposition of energy due to mechanical loading.

A simulant can be made that can be used to mock vapor signatures as well as the chemical compositions of pure explosives. The recently developed technique of neutron backscattering can be used to analyze for nitrogen, oxygen, or other unusual elemental compositions found in explosives. Selecting a non-reactive component that is rich in nitrogen, oxygen, or another element found in an explosive, in conjunction with the energetic phase which is rich in nitrogen, oxygen, or another element, should be adequate to simulate most energetic materials for this method of detection and other non-invasive approach. An explosive simulant may involve simulation of any explosive chemical element by substituting the element in the reactive material with the same element in the inert phase. Explosives can also be simulated in terms of their chemical bonding pattern, x-ray absorption, and elemental isotopic ratios. Isotopic ratios in a simulant can mock those found in real explosive samples. Hence, not only can an explosive simulant emulate chemical and elemental properties, it can also simulate isotope ratios.

Thus, the non-detonable explosive simulants of the present invention are fabricated by methods which involve formulating materials with large surface areas of explosives, but with volumes too small to sustain detonation or explosion. Two fabrication methods or techniques are set forth hereinafter. The first method uses standard slurry coating techniques to produce a material with a very high binder to explosive ratio. The binders are to be selected and treated so that they would not mask the explosives vapor. The second method involves coating inert beads, fibers, or other high surface area materials with thin layers of explosive molecules. A variety of different substrates can be used ranging from polystyrene to ceramic materials. Mass spectral analysis has been carried out to verify that certain explosives and their explosive simulants produce analogous vapor signatures. Similar mass spectral analysis can also determine isotope ratios.

Figure 1B:
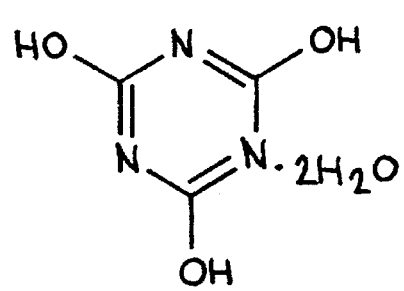
Figure 2:
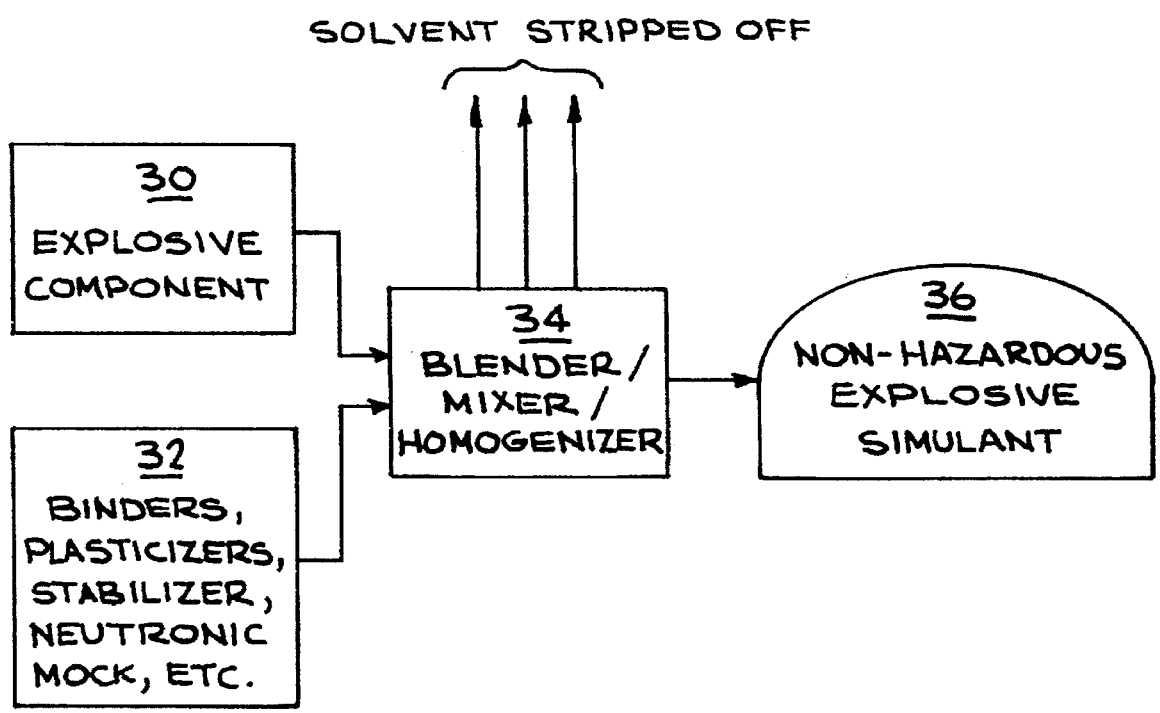
FIG. 2 is an illustration of a process of making an explosive simulant in an embedded matrix.
Figure 5A:
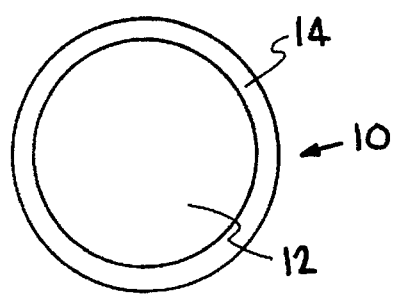
FIG. 5A is a cross-section of an embodiment of a coated bead or fiber forming an explosive simulant.
Figure 5B:
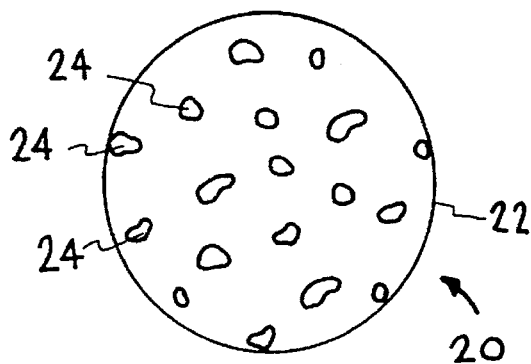
FIG. 5B is a cross section of an embodiment of explosive distributed in an inert matrix forming an explosive simulant.

A TNT simulant has been fabricated in accordance with the present invention, with cyanuric acid as the non-reactive component. The chemical formulas of TNT and cyanuric acid, respectively, are illustrated in FIGS. 1A and 1B, with the following chemical characteristics of cyanuric acid being MW:165.11, m.p.:360° C., b.p.:decomposes, density: 1.768 g/cm$^3$, solubility: water, slightly in alcohols. Formulation of two TNT/cyanuric acid simulants was carried out to verify the invention using standard slurry coating techniques, which basically involved dissolving TNT in acetone, adding cyanuric acid to the TNT/acetone solution, and while maintaining vigorous mixing, removing the solvent (acetone) by vacuum air sweep and heating to 50° C. The process is illustrated in FIG. 2. Explosive 30 and inert material 32 which includes binders plasticiziers, stabilizers, neutronic mock, etc. are combined in blender/mixer/homogenizer 34 to produce simulant 36. As shown in FIG. 5B, explosive simulant 25 is formed of inert material matrix 22 having explosive 24 distributed substantially homogeneously therein. Typical ratios are 5–20% by weight of TNT and 80–95% by weight of cyanuric acid. The compositions of these two formulations, identified as RS-01-AA and RS-01-AB, are set forth hereinafter in Table I:

TABLE I

Formulation Compositions

| Simulant | Cyanuric:TNT wt. % | Cyanuric:TNT vol. % | TMD[a] (g/cm$^3$) |
|---|---|---|---|
| RS-01-AA | 80.0:20.0 | 78.9:21.1 | 1.744 |
| RS-01-AB | 90.0:10.0 | 89.4:10.6 | 1.756 |

[a]TMD is theoretical maximum density.

By way of specific example, the TNT/cyanuric acid formulation was carried out as follows:

1. 150 grams of TNT was dissolved in 750 grams of solvent composed of acetone at a temperature of 25° C.
2. 1350 grams of cyanuric acid was added to the thus formed TNT/acetone solution at a temperature of 50° C.
3. The thus formed TNT/acetone/cyanuric mixture was submitted to vigorous mixing in a mixer operating at a medium speed setting, the mixer, for example, being a 1-gallon Baker-Perkin Vertical High Shear Mixer.
4. While maintaining the vigorous mixing, the solvent was removed by vacuum air sweep in a mixer operating at a medium speed and vacuum of less than one atmosphere, while heating the mixture to 50° C. for a time period of 25 minutes, which produced 1500 grams of TNT simulant.

Small scale safety tests were performed on the formulation compositions set forth above in Table I, and the result of the safety tests are listed in Table II:

TABLE II

Small Scale Safety Test Results

| Simulant | Impact[a] (cm) | Friction[b] (kg) | Spark[c] | CRT[d] (cm$^3$/g) | DSC[e] (°C.) |
|---|---|---|---|---|---|
| RS-01-AA | off-scale | off-scale | no rxn | 0.016 | 250 |
| RS-01-AB | off-scale | off-scale | no rxn | 0.044 | 250 |

[a]2.5 kg Type 12 tool with 35 mg pressed samples.
[b]Julius-Peters-Berlin 21 friction machine. One reaction in ten tries.
[c]Ten tries at 1J with 510 Ω in line resistance.
[d]Chemical Reactivity Test. 22 h at 120° C. under 1 atm He.
[e]Differential Scanning Calorimetry. Onset of exotherm.

Figure 3:
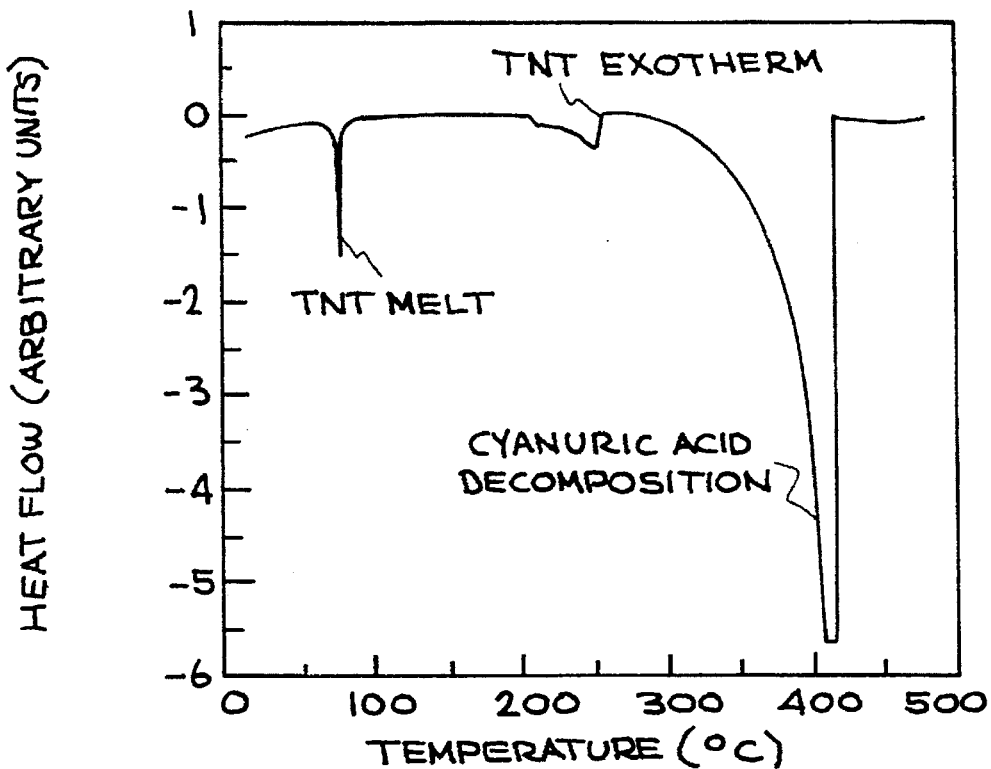
FIG. 3 is a graph illustrating differential scanning calorimetry results with a first explosive simulant at a scan rate of 10° C./min.
Figure 4:
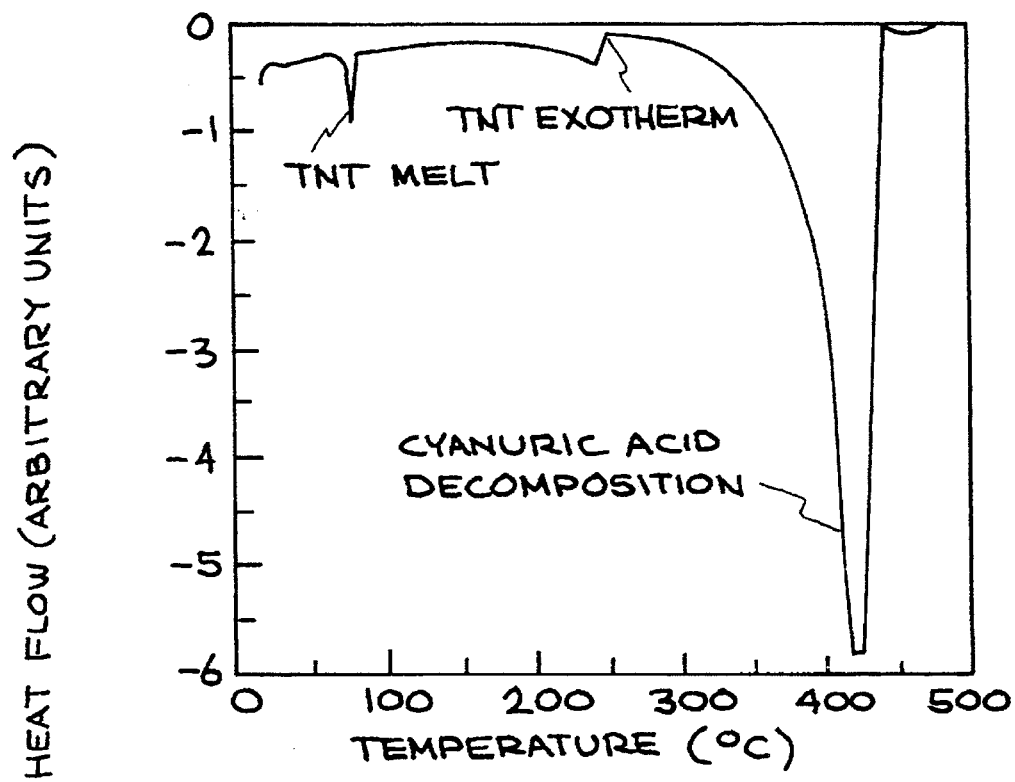
FIG. 4 is a graph similar to FIG. 3 of a second explosive simulant.

The thermal stability results of the two simulant formulations RS-01-AA (20% TNT) and RS-01-AB (10% TNT) as determined by differential scanning calorimetry, are respectively shown in FIGS. 3 and 4. The TNT solid-to-liquid phase transition can be identified at 80° C. At 250° C. there is a small exotherm due to TNT decomposition. The large endotherm beginning at 300° C. is attributed to the decomposition of cyanuric acid.

To examine sensitivity to shock, two plate dent experiments were performed. Parts that were 12.7 mm long and 12.7 mm in diameter were pressed with each of the two simulant formulations. Pressures of 200 MPa without vacuum and at ambient temperature yielded samples having densities of 92.5% TMD and 90.5% TMD with material formulations RS-01-AA and RS-01-AB, respectively. Initiation (detonation) was attempted with each material using RP-87 detonators. No deformations to mild steel plates adjacent to the simulants were produced by either material. Analysis of the recovered fractured simulant parts showed no visible evidence of reaction (detonation).

Flammability tests to ascertain the burn properties of the TNT simulants, tests for the possibility of chemical incompatibilities between TNT and the cyanuric acid, and tests relative to the TNT of the simulant decomposing over a period of time, have been completed successfully. Both the TNT simulant formulations RS-01-AA and RS-01-AB, described above, which have been scaled to 1500 g, have met or exceeded expectations in regard to processing and small scale sensitivity tests.

Figure 6:
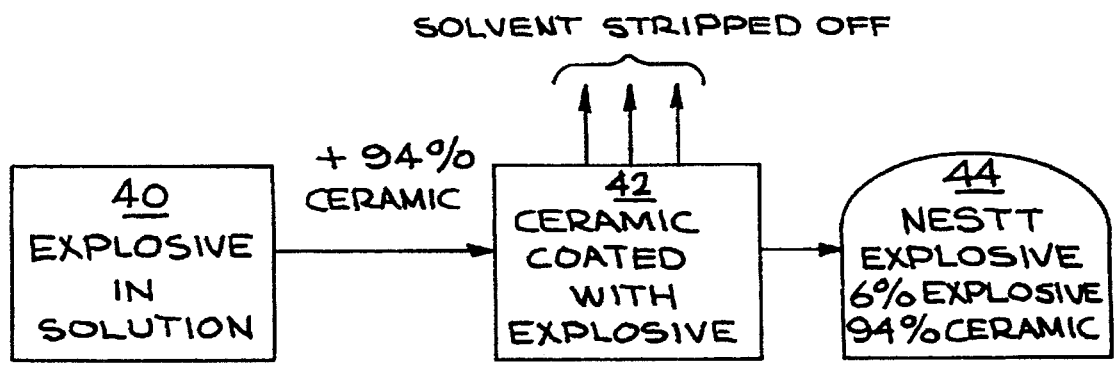
FIG. 6 is an illustration of a process of making an explosive simulant with explosive coated on substrate.

Explosive simulants in accordance with the invention can also be produced by coating inert beads, or other substrates composed of inert material such as cyanuric acid, melamine, glass, ceramics, with explosive molecules, such as TNT, RDX or nitrocellulose or any of the other previously listed explosives. Similarly, coatings may be made on other substrates including fibers, foams, and like structures to produce materials having a large ratio of explosive surface area to the volume of inert material. The explosive simulant 10, as shown in FIG. 5A is formed of an inert core 12, e.g. bead or fiber, with a thin coating 14 of explosive. The process is illustrated in FIG. 6. Explosive is dissolved in solvent, producing solution 40, to which is added inert material in the form of beads, fibers, or other substrates, producing explosive coated substrates 42 in solvent, from which the solvent is removed, leaving explosive simulant 44 of a minor amount of explosive coated on substrates.

By way of example, the method may be carried out by the following sequence of operational steps:

1. Selecting inert beads constructed of cyanuric acid having a diameter of approximately 5–1000 μm; and 2. Coating the beads with a layer, having a thickness of approximately 1–10 μm, of TNT molecules by the following procedure:
   a. dissolving TNT molecules in acetone solvent to form a lacquer,
   b. mixing the cyanuric acid beads with the lacquer to coat the beads with lacquer,
   c. heating the mixture to 55° C. while stirring in a vertical high shear mixer at medium speed while pulling a vacuum to remove the solvent.

Figure 7A:
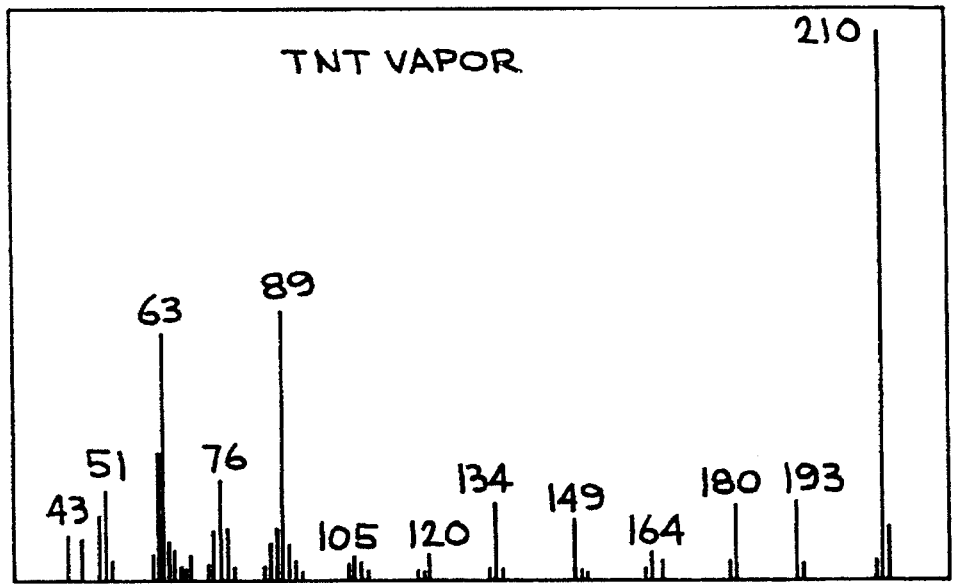
FIG. 7A, B are the mass spectra of TNT vapor and TNT simulant vapor, respectively.
Figure 7B:
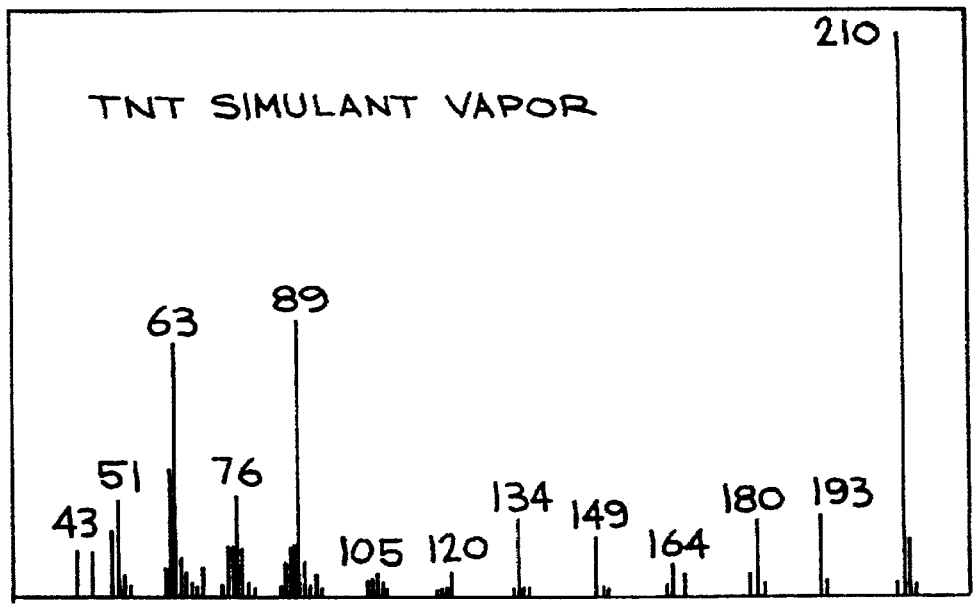

The chemical characteristics of the explosive and the simulant are the same. FIGS. 7A, B show the mass spectra of vapors of TNT and TNT simulant, respectively, which are identical.

Figure 8:
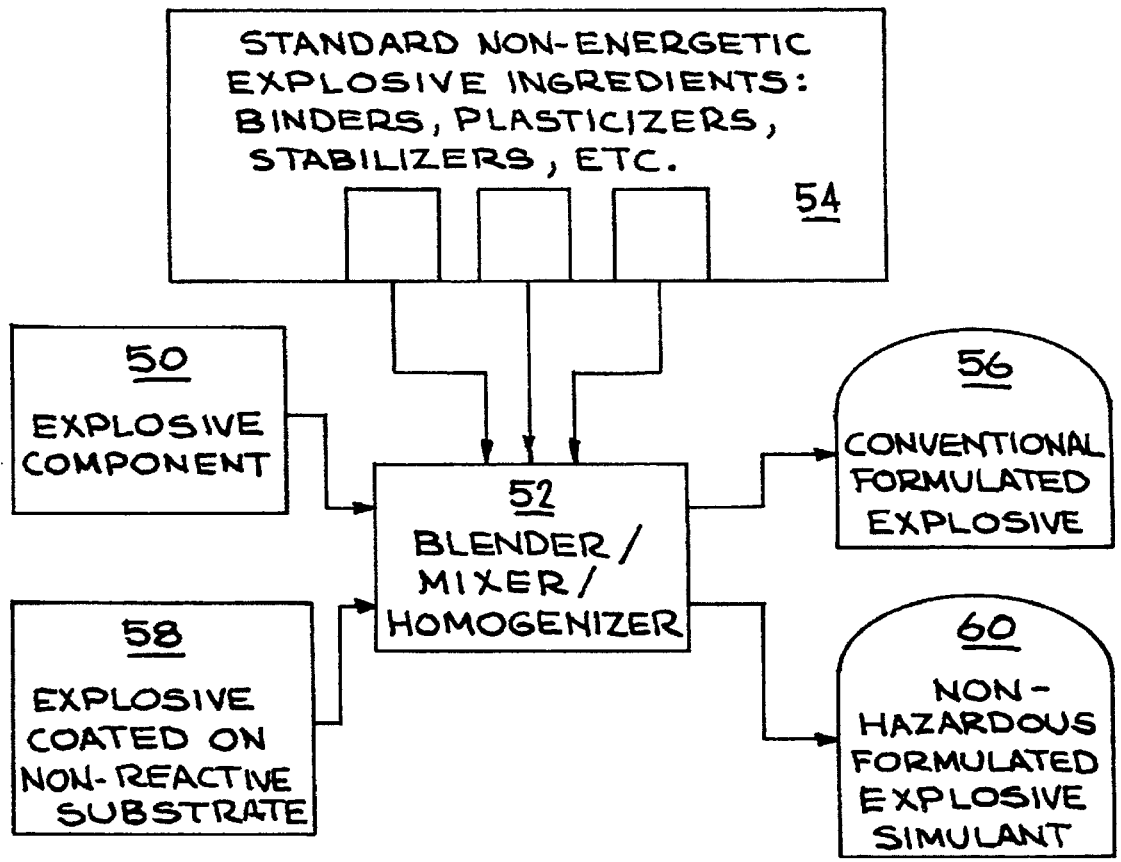
FIG. 8 is an illustration of a process of making a formulated explosive and a formulated explosive simulant.

The invention can be used to make formulated explosive simulants, e.g. plastic explosive simulants, as shown in FIG. 8. Plastic explosive 56 is formed by mixing explosive 50 in plastic or plastic/oil and other materials 54 in mixing apparatus 52. Plastic explosive simulant 60 is produced by treating explosive simulant 58, as described above, in mixing apparatus 52 in the same way as explosive 50 is treated, i.e. the simulant is substituted for the explosive in the formulation process.

Thus, the invention provides a non-detonable explosive and nonexplosive simulator. Testing has shown the explosive simulant formulations are insensitive to impact, spark, friction, temperature, and shock. These explosive simulants have been scaled to 1.5 kg quantities for use in field evaluation by explosives detecting canines. Thus, the training hazards posed by the use of actual explosives and the increased costs due to training, shipping, storage, and security requirements may be substantially reduced by utilizing the explosive simulants. In addition, by use of explosive simulants, training can be carried out in critical areas previously forbidden. Thus, the present invention substantially advances the field of explosive detection training, be it by canines or sensitive instruments. Likewise, other applications where explosives simulation is required may be met by this invention.

While particular methods, materials, parameters, etc. have been described and/or illustrated, such is not intended to limit the scope of this invention. Modifications and changes will become apparent and it is intended that the scope of the invention be limited only by the scope of the appended claims.

We claim:

1. A non-detonable and non-explodable explosive simulant comprising:
   a quantity of an explosive material;
   a quantity of a non-explosive material;
   said materials being combined in proportions such that the combination is at least one of scent, chemical element, chemical bonding pattern, x-ray absorption, and isotope ratio equivalent to said explosive material, but is not detonable or explodable.

2. The explosive simulant of claim 1, wherein said explosive material is selected from the group consisting of aliphatic and aromatic nitro compounds, nitrate esters, nitramines, and acid salts.

3. The explosive simulant of claim 2, wherein the explosive material is selected from the group consisting of nitromethane; 5-nitro triazol-3-one (NTO); nitrobenzene; trinitrotoluene (TNT); dinitrotoluene (DNT); mononitrotoluene (MNT); picric acid; trinitro triamino benzene (TATB); 3,5-dinitro-2,6-bis-picrylamino pyridine (PYX); methyl nitrate; nitroglycerine (NG); ethylene glycol dinitrate (EGDN); diethylene glycol dinitrate (DEGDN); MTN; 2,2-bis[(nitroxy)methyl]-1,3-propanediol dinitrate (or pentaeritol tetranitrate) (PETN); nitrocellulose; trimethylol ethyl trinitrate (TMETN); tetryl; hexahydro-1,3,5-trinitro-1,3,5-triazine (RDX); methylamine nitrate; octahydro-1,3,5,7-tetranitro-1,3,5,7-tetrazocine (HMX); nitroguanidine; ammonium nitrate; ammonium perchlorate; urea nitrate; ammonium picrate; lead azide; lead styphnate; mercury fulminate and other fulminates.

4. The explosive simulant of claim 2, wherein said explosive material is TNT, said non-explosive material is cyanuric acid and said TNT and cyanuric acid have a respective percentage by weight of TNT in the range of about 5% to about 20%, and a percentage by weight of cyanuric acid in the range of about 95% to about 80%.

5. The explosive simulant of claim 1, wherein said non-explosive material is in the form of a substrate, and wherein said explosive material is in the form of a coating on the substrate.

6. The explosive simulant of claim 5, wherein said substrate is beads or fibers having a diameter of about 5–1000 μm, and wherein said coating has a thickness in the range of about 1 to 10 μm.

7. The explosive simulant of claim 5, wherein said substrate is constructed from an inert material and said coating is formed from a material selected from the group consisting of nitromethane; 5-nitro triazol-3-one (NTO); nitrobenzene; trinitrotoluene (TNT); dinitrotoluene (DNT); mononitrotoluene (MNT); picric acid; trinitro triamino benzene (TATB); 3,5-dinitro-2,6-bis-picrylamino pyridine (PYX); methyl nitrate; nitroglycerine (NG); ethylene glycol dinitrate (EGDN); diethylene glycol dinitrate (DEGDN); MTN; 2,2-bis[(nitroxy)methyl]-1,3-propanediol dinitrate (or pentaeritol tetranitrate) (PETN); nitrocellulose; trimethylol ethyl trinitrate (TMETN); tetryl; hexahydro-1,3,5-trinitro-1,3,5-triazine (RDX); methylamine nitrate; octahydro-1,3,5,7-tetranitro-1,3,5,7-tetrazocine (HMX); nitroguanidine; ammonium nitrate; ammonium perchlorate; urea nitrate; ammonium picrate; lead azide; lead styphnate; mercury fulminate and other fulminates.

8. The explosive simulant of claim 6, wherein said substrate is cyanuric acid, and wherein said coating is TNT.

9. The explosive simulant of claim 1, wherein the explosive simulant is mixed with another material to form a formulated explosive simulant.

10. The explosive simulant of claim 3 wherein said non-explosive material is in the form of a matrix and said explosive material is distributed in the matrix.

* * * * *